Figure 1:
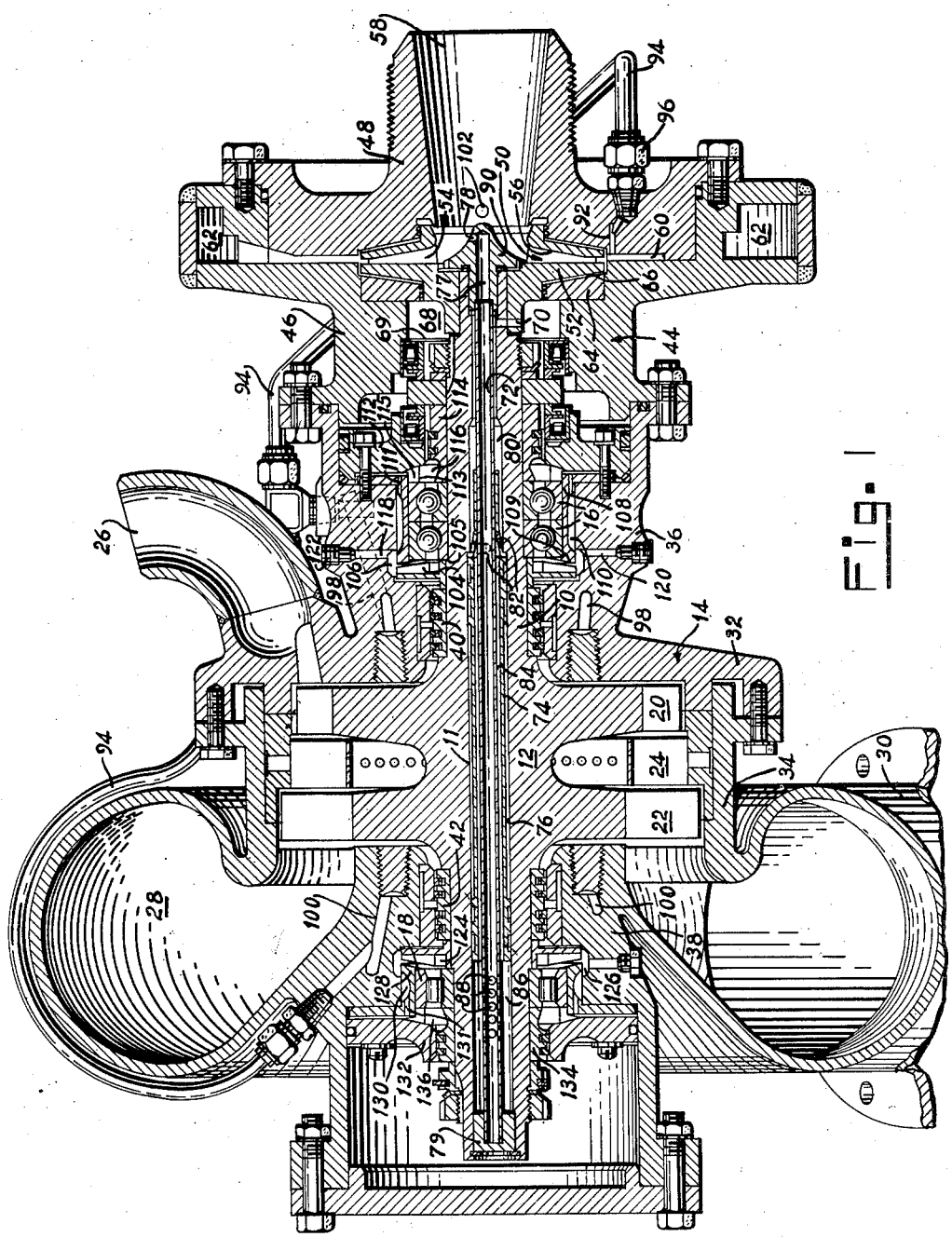

Aug. 12, 1952     L. L. DREIBELBIS     2,606,501
TURBOPUMP STRUCTURE

Filed July 21, 1948     2 SHEETS—SHEET 1

INVENTOR.
LOGAN L. DREIBELBIS
BY Virgil F. Davies
and
Albert P. Davis
ATTORNEYS

INVENTOR.
LOGAN L. DREIBELBIS

BY Virgil F. Davies
and
Albert P. Davis
ATTORNEYS

Patented Aug. 12, 1952

2,606,501

UNITED STATES PATENT OFFICE 2,606,501

TURBOPUMP STRUCTURE

Logan L. Dreibelbis, San Juan, Tex., assignor to
The M. W. Kellogg Company, Jersey City, N. J.,
a corporation of Delaware Application July 21, 1948, Serial No. 39,899

4 Claims. (Cl. 103—87)

The present invention relates to a rotary power unit, and more particularly to means for cooling and lubricating the bearings thereof.

The provision of effective cooling and lubrication for the anti-friction bearings in a rotary power unit, such as a high speed turbine is a difficult design problem. This is especially true when the motive fluid driving the turbine rotor has a high initial temperature, as in the case of a gas turbine, and where the unit is intended to be operated in any position, and at extremely high altitudes, as in an aircraft or other airborne device, where only low density air is present and therefore not suitable for use as a coolant or vehicle for a lubricant. In such a power unit, extreme care must be taken to insure adequate cooling and lubrication of the bearings to avoid any possibility of bearing failure and the resulting failure of the power unit. It is also essential that the cooling and lubricating means provided be compact and light in weight to permit the power unit to meet the space and weight limitations that necessarily accompany airborne applications.

One object of the present invention is to provide new and improved means for cooling the bearings of a rotary power unit.

Another object of the present invention is to provide new and improved means for lubricating the various bearings of a rotary power unit.

Another object of the present invention is to provide new and improved means for cooling and lubricating the various bearings of the rotary power unit.

Another object of the present invention is to provide a positive lubricating arrangement for a turbine unit which is unaffected by the position of the turbine unit in space.

Another object of the present invention is to provide a turbine unit capable of operation at extremely high altitudes wherein means are provided to cool and lubricate the bearings thereof.

Another object of the present invention is to provide a rotary power unit, adapted to operate at high temperature and having an anti-friction bearing forming a part thereof, with means for maintaining both races of said anti-friction bearing at substantially the same temperature.

Another object of the present invention is to provide a turbine and pump unit adapted to pump a fuel, or oxidizing agent for a fuel, to a rocket motor and provided with means to utilize a portion of said fuel, or oxidizing agent, for cooling the various bearings and/or lubricating system of said turbine.

Other objects of the invention will in part be obvious and will in part appear hereinafter.

The invention accordingly comprises the apparatus possessing the construction, combination of elements and arrangement of parts which are exemplified in the following detailed disclosure, and the scope of its application will be indicated in the claims.

Figure 2:
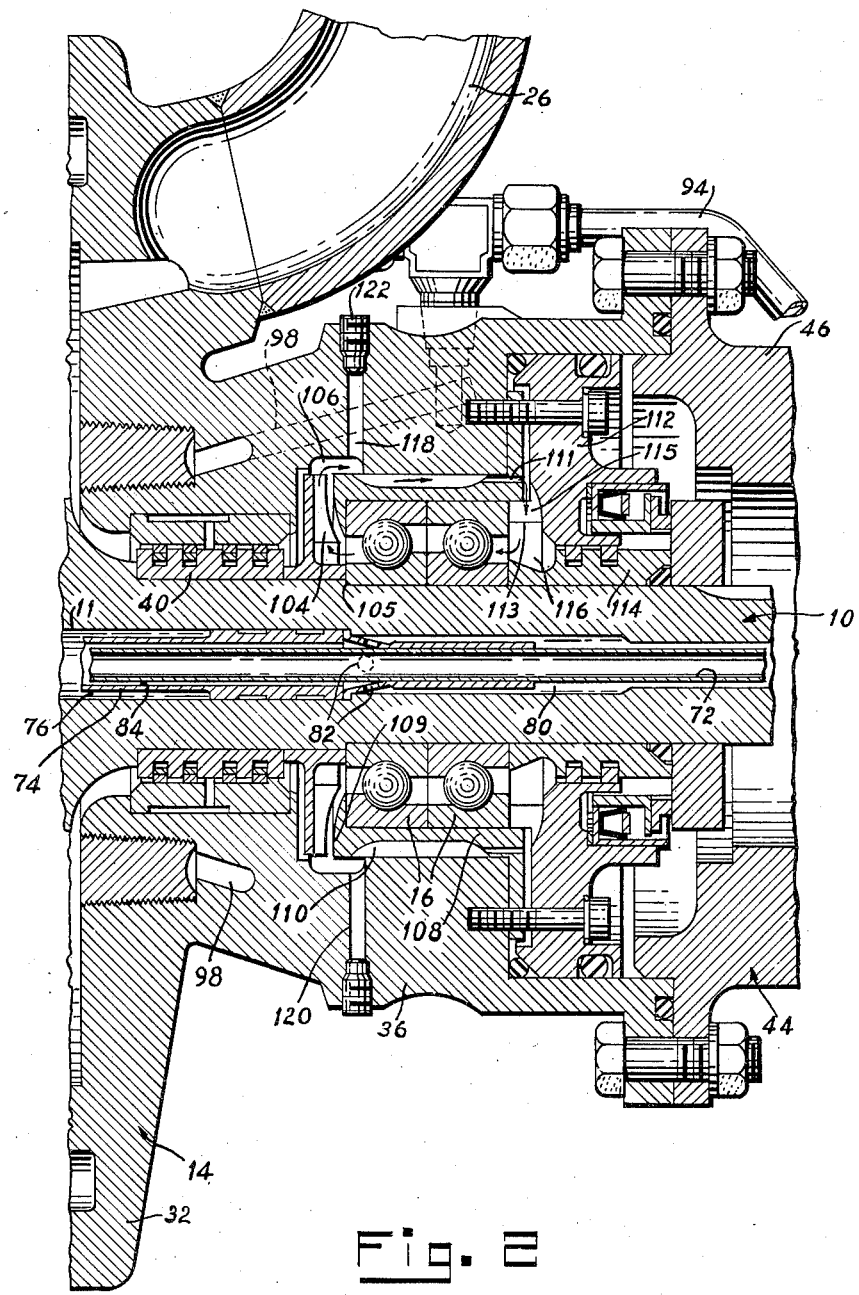

For a further understanding of the nature and objects of the invention reference should be had to the following detailed description taken in connection with the accompanying drawings wherein:

Fig. 1 is a view mainly in axial section and partly in side elevation of a gas turbine unit embodying the features of the present invention; and Fig. 2 is an enlarged fragmentary view showing details of the cooling and lubricating means for one of the anti-friction bearings of Fig. 1.

The present invention is primarily concerned with providing means for cooling and lubricating the bearings of a gas turbine adapted to operate at high altitudes to drive a pump to provide fluid fuel, and/or oxidizing agent for said fuel, to a rocket motor. The present invention comprises a self-contained, sealed lubricating system for predetermined bearings in the turbine, whereby a mist of lubricant is circulated through each bearing independent of the presence or absence of outside air, and which does not require a supply of gas under pressure, and means for cooling said bearings and said lubricating mist by means of a small percentage of the fluid pumped by the pump. After serving as a coolant the fluid is returned to the pump for delivery to the rocket motor. It will be understood that the present invention can be applied to rotating equipment of other types where it is desirable or necessary to cool the bearings and insure highly efficient lubrication.

Referring to the drawing the rotary power unit of the present invention is shown in the form of a small high speed gas turbine comprising a hollow shaft 10 having integrally formed thereon a two-stage turbine wheel 12. Shaft 10 and turbine wheel 12 are rotatively supported in a casing 14 by means of anti-friction bearings 16 and 18 located on opposite sides of the turbine wheel 12. Hollow shaft 10 has a hole or bore 11 extending longitudinally thereof from end to end, and substantially concentric therewith.

Turbine wheel 12 is shown as having two annular axially spaced series of blades 20 and 22 at its outer periphery which are separated by an annular series of fixed blades 24 rigid with the casing 14. The blades 20 and 22 are preferably of the impulse type and constitute two multi-velocity stages, while the blades 24 serve as intermediate guide blades in a manner well known in the art.

Casing 14 is provided with a plurality of inlets 26 (only one is shown to avoid confusing the drawing) for the motive fluid, which may be exhaust gases or other highly heated gases coming from an associated engine, or from a combustion chamber. Inlets 26 are spaced circumferentially around casing 14 and are in communication with the interior of casing 14 in such a manner that the gas is directed into the field of action of the first stage of blade 20. The exhaust side of the second stage of blades 22 communicates with an exhaust chamber 28 which merges into a conduit 30 by which the turbine exhaust may be carried away from the unit.

The casing 14 is shown as constituting two main sections 32 and 34. Casing section 32 includes the inlets 26 and casing section 34 includes the exhaust chamber 28. Inlet casing section 32 carries a bearing housing 36. Exhaust casing section 34 carries bearing housing 38. Bearing housings 36 and 38 respectively carry anti-friction bearings 16 and 18 which serve to rotatively position turbine wheel 12 in the casing 14. An annular seal 40 is carried by bearing housing 36 between anti-friction bearing 16 and turbine wheel 12, and a similar annular seal 42 is carried by bearing housing 38 between anti-friction bearing 18 and turbine wheel 12. Annular seals 40 and 42 form a substantially gas tight sliding seal between the interior of casing 14 and the interior of bearing housings 36 and 38 and prevent the escape of motive gas from casing 14 into the interior of housings 36 and 38.

A centrifugal pump adapted to be driven by the turbine unit is carried by bearing housing 36. The centrifugal pump comprises a pump housing 44, formed by a sleeve portion 46 and an end plate 48, and a centrifugal impeller 50, comprising flange 52, vanes 54, and shroud plate 56, rotatively carried by shaft 10 in said pump housing 44. The primary function of the centrifugal pump formed by the housing 44 and impeller 50 is to supply a rocket motor with liquid fuel, or an oxidizing agent for fuel, by drawing the liquid through axial pump inlet 58 in an end plate 48, and passing the liquid on to the rocket motor by means of annular chamber 60, which receives said liquid under pressure from impeller 50, and discharge duct 62, which communicates with annular chamber 60, and which conducts the fluid to the rocket motor, or to a conduit for that purpose. The present invention utilizes a portion of the output of the centrifugal pump to cool bearings 16 and 18 of the turbine unit, and to cool the lubricant used to lubricate said bearings. After serving as a coolant for bearings 16 and 18, and the lubricant therefore, the fluid is returned to the lower pressure side of the pump.

A sealing ring 64 is carried by housing sleeve 46 and located closely adjacent to impeller 50. A slight clearance 66 is provided between flange 52 and sealing ring 64, and a sliding seal is provided between the inner peripheral surface of said sealing ring 64 and the hub of impeller 50. When the above described centrifugal pump is in operation it is inevitable that a slight amount of the fluid under pressure will pass through clearance 66 and will make its way through the sliding seal between sealing ring 64 and the hub of impeller 50. It is customary in centrifugal pumps of this general type to take care of this leakage by providing some means for collecting the fluid and removing it from the pump housing 44 to prevent its building up a dangerously high pressure therein. However, the present invention takes advantage of the leakage or seepage of fluid around the impeller by using the fluid that thus leaks around impeller 50 as a coolant for the bearings of the gas turbine which drives the centrifugal pump.

An annular passage 68, formed by a portion of the inner peripheral wall of sleeve portion 46, sealing ring 64, the hub of impeller 50, shaft 10, and inner sealing ring 69, is provided to collect the fluid as it passes through the seal provided by sealing member 64 and the hub of impeller 50. A radial passage 70 is provided through the hub of impeller 50 and shaft 10 to permit communication between annular passage 68 and hole or bore 11 in shaft 10. Hole or bore 11 is provided with concentric tubes 72 and 74 which function as heat barriers and to direct the flow of fluid entering said bore 11 first in a direction towards the exhaust end of shaft 10 to cool bearings 16 and 18, and then back along the central portion thereof and into inlet opening 58. To accomplish this, tube 72, having one of its ends journaled in axial hole 77 in impeller attaching and fairing device 90, extends axially throughout the length of bore 11, and has its other end journaled in bore plug 79, to form annular spaces 80 and 86 adjacent bearings 16 and 18 respectively. Fluid collected in annular passage 68 passes from said passage 68 through radial passage 70 into and along annular space 80 cooling shaft 10, and by conduction, cooling the inner races of anti-friction bearings 16. It is desirable, to insure the efficient utilization of the high temperature turbine motive fluid, that any great amount of heat loss from turbine wheel 12 be prevented. It is also desirable to provide anti-friction bearing 18 with cooling fluid. Therefore, a heat barrier, comprising a second concentric tube 74, is located between tube 72 and the wall of bore 11 and spaced between anti-friction bearings 16 and 18, to form annular space 84 between itself and tube 72, and insulating space 76 located between itself and the wall of bore 11. The cooling fluid leaves annular space 80 and enters annular space 84 by passing through openings 82 in concentric tube 74. Insulated from the intense heat of rotor 12 by means of tube 74 and insulating space 76, the cooling fluid passes through annular space 84 and enters annular space 86 adjacent anti-friction bearing 18. The cooling fluid there cools the shaft 10, and by conduction cools the inner race of anti-friction bearing 18. The cooling fluid then leaves annular space 86 and enters concentric tube 72 through openings 88 in the wall thereof, and returns to the inlet of the centrifugal pump through said tube 72 and axial opening 77 and radial holes 78 in impeller attaching and fairing device 90.

Means are also provided whereby a small amount of the liquid pumped by the centrifugal pump is used to cool the outer races of, and the lubricant for, anti-friction bearings 16 and 18. Passageway 92 is provided in end plate 48 and serves as a means for trapping and removing a predetermined amount of high pressure fluid from the annular chamber 60. Tube 94 is connected to passageway 92 by means of fitting 96. Bearing housings 36 and 38 are respectively provided with winding or labyrinthlike passageways 98 and 100, which provide coolant passages in, and extending completely around, the walls of their respective bearing housings. Passageways 98 and 100 can be formed, if housings 36 and 38 are cast, by means of cores, or they can be machined by drilling diagonal holes, longitudinally of said housings 36 and 38, joined to each other at their ends, and by plugging the holes where they extend through the ends of said housings. Cooling fluid is supplied to passageways 98 and 100 by means of tube 94. After the cooling fluid has circulated around bearing housings 36 and 38 through passageways 98 and 100, the fluid is returned to the centrifugal pump by means of a second tube (not shown) and admitted to the low pressure side of said pump through opening 102. It will thus be seen that the outer bearing races of antifriction bearings 16 and 18 are cooled by circulating a coolant through bearing housings 36 and 38 to cool said housings which in turn cool said outer bearing races by conduction, and by cooling the supply of lubricant which is circulated through bearings 16 and 18 in a manner to be explained more in detail later.

The present invention also includes a lubricating system for anti-friction bearings 16 and 18. A bearing locating and supporting sleeve 108 is located in bearing housing 36. The outer races of anti-friction bearing 16 are supported by sleeve 108 and are accurately positioned axially of housing 36 by means of flange 109 formed on the inner end of sleeve 108. An annular space 106 is provided in housing 36 adjacent the inner end of bearing 16, and a centrifugal impeller or blower 104, rotatably carried by shaft 10, is located in said space 106. Bearing end plate 112 and sealing ring 114 enclose and seal anti-friction bearings 16 in housing 36. Bearing end plate 112 by means of flange 113, forming a part thereof, holds the outer races of anti-friction bearings 16 in sleeve 108 and against flange 109. The inner end of sealing ring 114 holds the inner races of bearings 16 in position on shaft 10 and against bearing shoulder 105 formed thereon. The inner ends, or sides, of bearing end plate 112 and sealing ring 114 cooperate to provide an annular space 116 at the outer end of bearings 16. Communication between the outer portions of annular spaces 106 and 116 is provided by means of a plurality of milled slots forming longitudinal channels or splines 110 in the outer periphery of bearing sleeve 108, a plurality of milled slots 115 forming radial passages in flange 113, and a plurality of drilled holes 111 in bearing sleeve 108 connecting channels or splines 110 with milled slots 115. It will thus be seen that a plurality of continuous passages are provided comprising the longitudinal channels or splines 110, the milled slots 115, and the holes 111, which connect the outer portions of annular spaces 106 and 116, and the space between the inner and outer races of anti-friction bearing 16 which connects the inner portions of annular spaces 106 and 116. Two openings 118 and 120 are provided through bearing sleeve 36 to give access to annular space 106. Opening 118 permits a predetermined quantity of lubricant to be placed in annular space 106, and opening 120 permits the lubricant to be drawn out of said annular space 106.

To lubricate anti-friction bearing 16 by means of the above described lubricating system a predetermined quantity of lubricant, which may be one of the silicone lubricants or any other suitable lubricant, is admitted to annular space 106 through opening 118 and opening 118 is closed by means of plug 122, and the gas turbine is started. Shaft 10 rotates centrifugal impeller or blower 104 causing said impeller 104 to throw the lubricant, contained in annular space 106, outwardly in said space 106. The lubricant then passes longitudinally through channels 110 and holes 111, and radially inwardly through radial passages 115 to enter annular space 116. From annular space 116 the lubricant passes through the space between the inner and outer races of anti-friction bearing 16 to cool and lubricate said bearing and to return to annular space 106. As the speed of the turbine increases the speed at which the lubricant circulates also increases until the lubricant and the air contained in housing 36 are completely and thoroughly mixed to form a lubricating mist or fog which is rapidly circulated through the above described continuous passageways. The mist or fog of lubricant, in addition to lubricating the bearing 16, also serves to further cool the bearing inasmuch as said mist of lubricant in passing through longitudinal channels 110 and holes 111 comes in contact with the bearing housing 36 and bearing sleeve 108 which, as above described, are cooled by the fluid circulated through passageway 98, and is thus cooled before passing through bearing 16.

Anti-friction bearing 18 is provided with a lubricating system substantially identical to the lubricating system above described in connection with anti-friction bearing 16. The lubricating system for anti-friction bearing 18 comprises a centrifugal impeller 124, an annular space 126, bearing sleeve 128, longitudinal channels 130, holes 131, and bearing end plate 132 and bearing seal 134, which together form annular space 136. All of these elements cooperate to provide anti-friction bearing 18 with a lubricating system similar in structure and function to the lubricating system for anti-friction bearing 16.

Two means for cooling both bearings 16 and 18 are provided. The fluid flowing through hollow shaft 10 cools the inner races of both bearings, and the fluid flowing through the two bearing housings 36 and 38 cools the outer races of both bearings, and the lubricant for the bearings. The combination of means to cool both the outer and inner races of the bearings is highly desirable to eliminate any possibility of bearing failure due to overloading or excess bearing play brought about by unequal expansion of the inner and outer races. For example, if only the outer bearing races were cooled, the inner races, due to the fact that they would be elevated to a higher temperature than the outer races, would expand a greater amount proportionally than said outer races. This would decrease the space between the inner and outer races, resulting in a much higher loading on the balls, or rollers, than they are designed to withstand and thus cause bearing failure in a short period of time. If only the inner races were cooled the outer races would expand a greater amount proportionally than said inner races. This would increase the space between the inner and outer races, resulting in excessive bearing clearance and play. At best excessive bearing clearance and play in high speed rotating equipment will reduce its efficiency, and can result in bearing failure.

The present invention makes it possible to cool both the inner and outer bearing races, and by controlling the flow of cooling fluid through hollow shaft 10 and through bearing housings 36 and 38 the two races can be maintained at substantially the same temperature, thus maintaining the proper bearing clearance and loading at all times.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. In a turbopump unit, a turbine wheel and a pump, a hollow shaft for said turbine wheel, a bearing for said shaft, a pump impeller mounted on said shaft, means comprising an annular passage surrounding said shaft adapted to collect fluid leaking from said pump, an opening through the wall of said shaft communicating between said annular passage and said shaft, means in said shaft adapted to cause liquid entering said shaft through said opening in the wall thereof to flow through said shaft adjacent said wall to cool said shaft and said bearing, and to flow along the center of said shaft in an opposite direction for return to said pump, and means for conducting said liquid to said pump.

2. In a turbopump unit, a turbine wheel and a pump, a shaft for said turbine wheel, said shaft having a longitudinal bore therein, a bearing for said shaft, a centrifugal pump impeller mounted on said shaft, means comprising an annular passage surrounding said shaft adapted to collect fluid leaking from the high pressure side of said pump, an opening through the wall of said shaft providing communication between said annular passage and said longitudinal bore, means in said longitudinal bore adapted to cause liquid entering said shaft through said opening in the wall thereof to flow along said longitudinal bore adjacent said wall to cool said shaft and said bearing, and to flow along the center of said longitudinal bore in an opposite direction for return to the low pressure side of said pump, and means for leading said liquid to said pump.

3. In a rotary power unit comprising a rotor, a hollow shaft for said rotor, an anti-friction bearing supporting said shaft, said bearing having an outer race and an inner race, a housing for said bearing, and a pump adapted to be driven by said shaft, the combination of a coolant passage in said housing, means for diverting a predetermined part of the output of said pump to said coolant passage to cool said outer race, and means for diverting another part of the output of said pump to said hollow shaft to cool said inner race, said two parts of said pump output being such that said two bearing races are maintained at substantially the same temperature.

4. In a rotary power unit, a rotor, a hollow shaft for said rotor, an anti-friction bearing, having an inner race and an outer race, supporting said shaft, a housing for said bearing, said housing having a coolant passage and an annular space at each end of said bearing, means providing communication between said annular spaces, means located in one of said annular spaces for circulating a lubricant through said communication means and said bearing, a pump adapted to be driven by said shaft, means for diverting a predetermined part of the output of said pump to said coolant passage to cool said outer bearing race and said lubricant, and means for diverting another part of the output of said pump to said hollow shaft to cool said inner bearing race, said two parts of said pump output being such that said two bearing races are maintained at substantially the same temperature.

LOGAN L. DREIBELBIS.

REFERENCES CITED

The following references are of record in the file of this patent:

UNITED STATES PATENTS

| Number | Name | Date |
|---|---|---|
| 1,433,037 | Reid | Oct. 24, 1922 |
| 2,042,575 | Worth | June 2, 1936 |
| 2,184,197 | Schutte | Dec. 19, 1939 |
| 2,223,847 | Engdahl | Dec. 3, 1940 |
| 2,352,206 | Kendall | June 27, 1944 |